United States Patent
Koseoglu et al.

(10) Patent No.: US 8,974,701 B2
(45) Date of Patent: Mar. 10, 2015

(54) INTEGRATED PROCESS FOR THE GASIFICATION OF WHOLE CRUDE OIL IN A MEMBRANE WALL GASIFIER AND POWER GENERATION

(71) Applicants: Omer Refa Koseoglu, Dhahran (SA); Jean Pierre Ballaguet, Dhahran (SA)

(72) Inventors: Omer Refa Koseoglu, Dhahran (SA); Jean Pierre Ballaguet, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/801,364

(22) Filed: Mar. 13, 2013

(65) Prior Publication Data
US 2013/0256601 A1    Oct. 3, 2013

Related U.S. Application Data

(60) Provisional application No. 61/616,179, filed on Mar. 27, 2012.

(51) Int. Cl.
| | | |
|---|---|---|
| C01B 3/22 | (2006.01) | |
| F01K 25/00 | (2006.01) | |
| C01B 3/36 | (2006.01) | |
| C01B 3/48 | (2006.01) | |
| C10J 3/74 | (2006.01) | |
| F02C 3/28 | (2006.01) | |
| C10J 3/48 | (2006.01) | |
| C10J 3/86 | (2006.01) | |
| C10K 3/04 | (2006.01) | |
| C10K 1/00 | (2006.01) | |

(52) U.S. Cl.
CPC . *C01B 3/22* (2013.01); *F01K 25/00* (2013.01); *C01B 3/36* (2013.01); *C01B 3/48* (2013.01); *C10J 3/74* (2013.01); *C10J 3/86* (2013.01); *F02C 3/28* (2013.01); *Y02E 20/18* (2013.01); *F05D 2220/722* (2013.01); *C10J 3/485* (2013.01); *C10K 3/04* (2013.01); *C10J 2300/0959* (2013.01); *C10J 2300/1653* (2013.01); *C10J 2300/1675* (2013.01); *C10J 2300/1678* (2013.01); *C10J 2300/0903* (2013.01); *C10J 2300/093* (2013.01); *C10J 2300/0989* (2013.01); *C10J 2300/1846* (2013.01); *C10K 1/003* (2013.01)
USPC .......................................... 252/373; 60/645

(58) Field of Classification Search
None
See application file for complete search history.

(56) References Cited

U.S. PATENT DOCUMENTS

| | | | | |
|---|---|---|---|---|
| 4,668,428 | A * | 5/1987 | Najjar .......................... | 252/373 |
| 4,851,151 | A * | 7/1989 | Najjar et al. .................. | 252/373 |
| 5,851,381 | A * | 12/1998 | Tanaka et al. ................. | 208/210 |
| 8,048,178 | B2 * | 11/2011 | Smit et al. ..................... | 48/197 R |
| 2002/0174603 | A1* | 11/2002 | Ahmed et al. ............. | 48/197 R |
| 2006/0029539 | A1* | 2/2006 | Dutta et al. .................... | 423/651 |
| 2007/0124997 | A1* | 6/2007 | Liu et al. ...................... | 48/198.7 |
| 2011/0210292 | A1* | 9/2011 | Ariyapadi et al. ............ | 252/373 |
| 2014/0103261 | A1* | 4/2014 | De Jong et al. ............... | 252/373 |

FOREIGN PATENT DOCUMENTS

IT    WO 2011/138809 A1 * 11/2011 ................ C01B 3/38

* cited by examiner

*Primary Examiner* — Melvin C Mayes
*Assistant Examiner* — Douglas Call
(74) *Attorney, Agent, or Firm* — Abelman, Frayne & Schwab

(57) ABSTRACT

An integrated process for the partial oxidation of whole crude oil mixed with a low cost finely divided solid ash-producing material in a membrane wall gasification reactor produces a syngas and, optionally, a more hydrogen-rich product stream by subjecting the syngas to a water-gas shift reaction. Process steam and electricity are produced by recovering the sensible heat values from the hot syngas.

14 Claims, 2 Drawing Sheets

INTEGRATED PROCESS FOR THE GASIFICATION OF WHOLE CRUDE OIL IN A MEMBRANE WALL GASIFIER AND POWER GENERATION

RELATED APPLICATIONS

This application claims the benefit of priority to U.S. application Ser. No. 61/616,179 filed Mar. 27, 2012, the disclosure of which is herein incorporated by reference.

BACKGROUND OF THE INVENTION

1. Field of the Invention

The present invention relates to processes for the partial oxidation of a whole crude oil feedstock in a membrane wall gasification reactor to produce a synthesis gas and electricity.

2. Description of Related Art

Gasification is well known in the art and it is practiced worldwide with application to solids and heavy liquid fossil fuels, including refinery bottoms. The gasification process uses partial oxidation to convert carbonaceous materials, such as coal, petroleum, biofuel, or biomass with oxygen at high temperature, i.e., greater than 800° C., into synthesis gas ("syngas"), steam and electricity. The syngas consisting of carbon monoxide and hydrogen can be burned directly in internal combustion engines, or used in the manufacture of various chemicals, such as methanol via known synthesis processes and to make synthetic fuels via the Fischer-Tropsch process.

In refinery operations, the main process block is known as the Integrated Gasification Combined Cycle (IGCC), which converts the feedstock into hydrogen, power and steam. FIG. 1 shows the process flow diagram of a conventional IGCC of the prior art, which includes a feed preparation section 102, a gasification reactor 104, an air separation unit 180, a syngas quench and cooling unit 110, a water-gas shift reactor 120, an acid gas removal (AGR) and sulfur recovery unit (SRU) 130, a gas turbine 140, a heat recovery steam generator (HRSG) 150, and a steam turbine 160.

In a conventional IGCC, a feedstock is introduced via a feed line 101 to the feed preparation section 102. The prepared feedstock is then passed to the gasification reactor 104 with a predetermined amount of oxygen 103 produced from the air separation unit 180. The feedstock is partially oxidized in the gasification reactor 104 to produce a hot syngas 106 which is conveyed to the syngas quench and cooling unit 110. Hot syngas 106 is cooled with boiler feed water 156 to produce cooled syngas 114 and steam. A portion of the steam 112 is passed to and used in the water-gas shift reactor 120 to produce shifted gas 122, and the remaining portion of the steam 116 is consumed in the HRSG 150. Shifted gas 122 is treated in the AGR/SRU 130 to separate and discharge carbon dioxide 136, sulfur 138; a portion of the hydrogen syngas which is recovered at 132. A second portion of the hydrogen syngas, identified as gas turbine feed 134, is passed to the gas turbine 140 with air feed 142 and combusted to produce electricity 144. The high pressure combustion gas discharge 146 from the gas turbine 140 is conveyed to the HRSG 150 to generate steam which is used in the steam turbine 160 to produce additional electricity 162.

The air separation unit 180 and most of the downstream processes utilize mature technologies with high on-stream reliability factors. However, the gasification reactor 104 has a relatively limited lifetime which can be as short as from 3 to 18 months, depending upon the characteristics of the feed and the design of the reactor.

The three principal types of gasification reactor technologies are the moving bed, fluidized bed and entrained-flow systems. Each of the three types can be used with solid fuels, but only the entrained-flow reactor has been demonstrated to efficiently process liquid fuels. In an entrained-flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 1300° C. to 1700° C.

There are two types of gasifier wall construction: refractory and membrane. The gasifier conventionally uses refractory liners to protect the reactor vessel from corrosive slag, thermal cycling, and the elevated temperatures that range from 1400° C. to 1700° C. The refractory is subjected to the penetration of corrosive components from the generation of the syngas and slag and, thereafter, to subsequent reactions in which the reactants undergo significant volume changes that result in strength degradation of the refractory materials. The replacement of the degraded refractory linings can cost several millions of dollars a year and several weeks of downtime for a given reactor. Up until now, the solution has been the installation of a second or parallel gasifier to provide the necessary continuous operating capability during maintenance downtime, but the undesirable consequence of this duplication is a significant increase in the capital costs associated with the unit operation.

An alternative membrane wall gasifier technology uses a cooling screen protected by a layer of refractory material to provide a surface on which the molten slag solidifies and flows downwardly to the quench zone at the bottom of the reactor. The advantages of the membrane wall reactor include reduced reactor dimensions as compared to other systems; a significantly greater average on-stream time of 90%, as compared to an on-stream time of 50% for a refractory wall reactor; elimination of the need to have a parallel reactor to maintain continuous operation as in the case of refractory wall reactors; and the build-up of a layer of solid and liquid slag that provides self-protection to the water-cooled wall sections.

In a membrane wall gasifier, the build-up of a layer of solidified mineral ash slag on the wall acts as an additional protective surface and insulator to minimize or reduce refractory degradation and heat losses through the wall. The water-cooled reactor design also avoids what is termed "hot wall" gasifier operation, which requires the construction of thick multiple-layers of expensive refractories which are subject to degradation. In the membrane wall reactor, the slag layer is renewed continuously with the deposit of solids on the relatively cool surface. Further advantages include shorter start-up/shut down times; lower maintenance costs than the refractory type reactor; and the capability of gasifying feedstocks with high ash content, thereby providing greater flexibility in treating a wider range of coals, petcoke, coal/petcoke blends, biomass co-feed and liquid feedstocks.

There are two principal types of membrane wall reactor designs that are adapted to process solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use. In both of these reactors, the flow of pressurized cooling water in the tubes is controlled to cool the refractory and ensure the downward flow of the molten slag. Both systems have demonstrated high utility with solid fuels, but not with liquid fuels.

The gasification reactor is operated to produce synthesis gas, or syngas. For the production of liquid fuels and petrochemicals, the key parameter is the mole ratio of hydrogen-to-carbon monoxide in the dry syngas. This ratio is usually between 0.85:1 and 1.2:1, depending upon the characteristics of the feedstock. Additional treatment of the syngas is needed to increase this ratio of hydrocarbon-to-carbon to 2:1 for Fischer-Tropsch applications, or to produce additional hydrogen through the water-gas shift reaction represented by $CO+H_2O \rightarrow CO_2+H_2$. In some cases, part of the syngas is burned together with some of the off gases in a combined cycle to produce electricity and steam. The overall efficiency of this process is between 44% and 48%.

While the gasification process is well developed and suitable for its intended purposes, its applications in conjunction with whole crude oil processes have been limited. In a typical refinery, whole crude oil is initially processed in an atmospheric distillation column or a crude tower where it is separated into a variety of different components including naphtha boiling in the range of from 36° C. to 180° C., diesel boiling in the range of from 180° C. to 370° C., and atmospheric bottoms boiling above 370° C. The atmospheric bottoms residue is further processed in a vacuum distillation column where it is separated into a vacuum gas oil (VGO) boiling in the range of from 370° C. to 520° C. and a heavy vacuum residue boiling above 520° C. The VGO can be further processed by hydrocracking to produce naphtha and diesel, or by fluid catalytic cracking (FCC) to produce gasoline and cycle oils. The heavy vacuum residue can be treated to remove unwanted impurities or converted into useful hydrocarbon products.

The problem addressed by the present invention is that of directly converting a whole crude oil feedstock of relatively low value in a process that is economically viable, and that is capable of producing a syngas and/or an enriched hydrogen system that can be used as a feedstream for other processes in the same refinery, or used to produce methanol and/or synthetic fuels.

SUMMARY OF THE INVENTION

The present invention comprehends the integrated processing of whole crude oil by the partial oxidation of the feedstock in a membrane wall gasification reactor to produce a syngas and/or hydrogen and to generate electrical power.

In accordance with one embodiment, the process for the gasification of a whole crude oil includes the steps of:
a. introducing a whole crude oil feedstock mixed with a solid ash-producing material into a membrane wall gasification reactor with a predetermined amount of oxygen and steam based on the carbon content of the feedstock;
b. subjecting the whole crude oil to partial oxidation to produce hydrogen and carbon monoxide in the form of a hot raw synthesis gas;
c. passing the hot raw synthesis gas to a steam generating heat exchanger to cool the hot raw synthesis gas and produce steam;
d. introducing the steam from the heat exchanger into a turbine to produce electricity; and
e. recovering the cooled synthesis gas.

In accordance with one or more additional embodiments of the invention, the process and apparatus for gasification of the whole crude oil further includes a water-gas shift reaction vessel to convert carbon monoxide to hydrogen through the water-gas shift reaction represented by $CO+H_2O \rightarrow CO_2+H_2$, to thereby increase the volume of hydrogen in the shifted syngas.

As used herein, the terms "ash-producing material" and "ash-forming material" are synonymous, and refers to a material that produces a solid ash to form slag in the membrane wall reactor.

The solid ash-producing material used in the process of the invention is selected from the group consisting of natural and synthetic oxides of Si, Al, Fe, Ca, Mg, P, K, Na, S and Ti, and mixtures thereof, and is in the form of finely divided particles and is mixed with the whole crude oil and constitutes 2% to 5% by weight of the total weight of the feedstock.

Other aspects, embodiments, and advantages of the process of the present invention are discussed in detail below. Moreover, it is to be understood that both the foregoing information and the following detailed description are merely illustrative examples of various aspects and embodiments, and are intended to provide an overview or framework for understanding the nature and character of the claimed features and embodiments. The accompanying drawings are included to provide illustration and a further understanding of the various aspects and embodiments. The drawings, together with the remainder of the specification, serve to explain principles and operations of the described and claimed aspects and embodiments.

BRIEF DESCRIPTION OF THE DRAWINGS

The foregoing summary, as well as the following detailed description will be best understood when read in conjunction with the attached drawings in which.

DETAILED DESCRIPTION OF THE INVENTION

Figure 1:
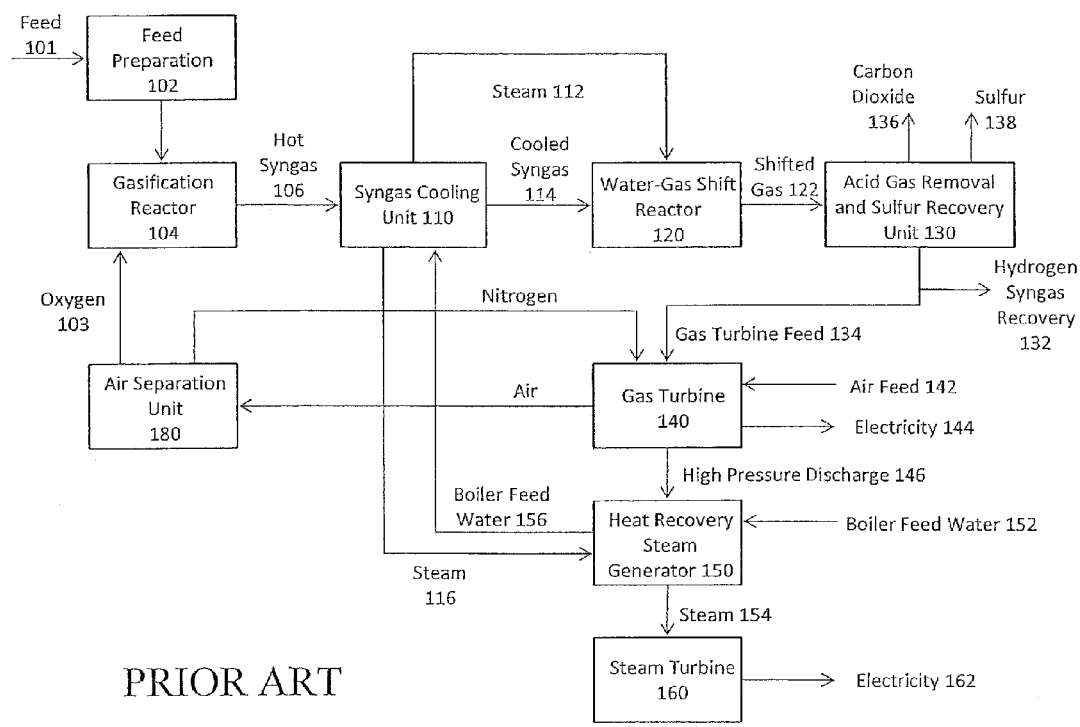
FIG. 1 is a schematic diagram of an integrated gasification combined cycle process of the prior art.
Figure 2:
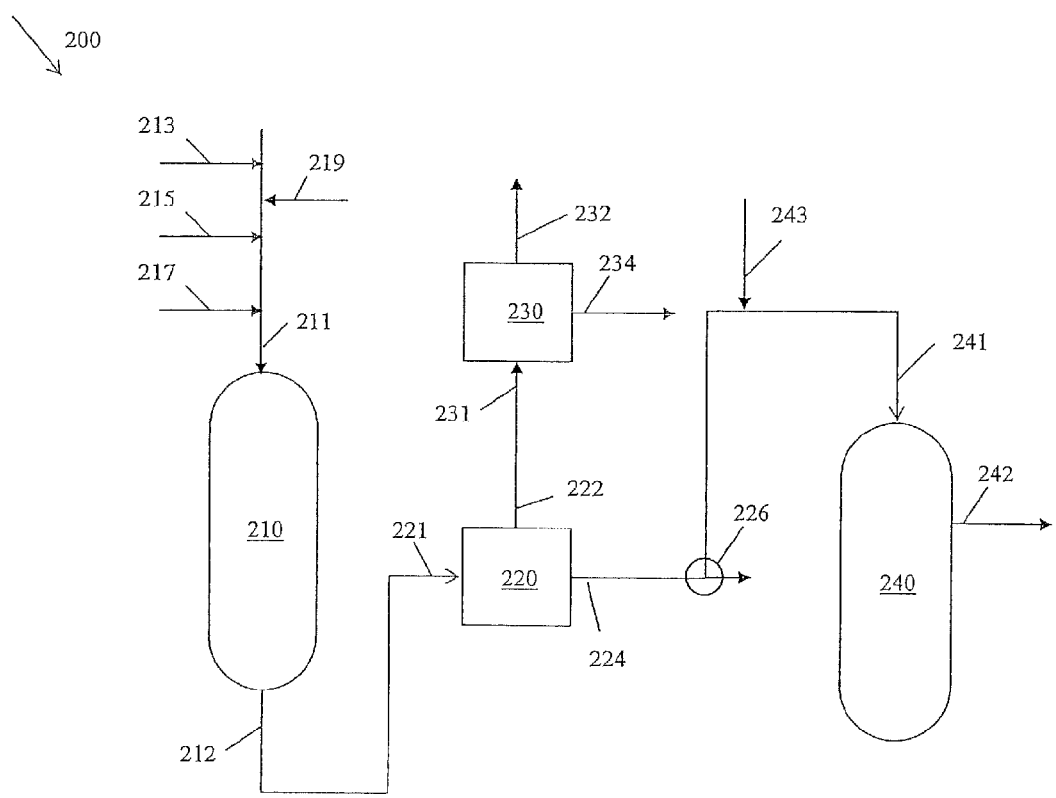
FIG. 2 is a schematic diagram of a process for the gasification of a whole crude oil feedstock in accordance with the present invention.

The integrated process for the production of a syngas and/or hydrogen by the partial oxidation of a whole crude oil feedstock in a membrane wall gasification reactor and the associated steam turbine for production of electricity will be described with reference to the schematic diagram of FIG. 2.

The whole crude oil gasification apparatus 200 includes a membrane wall gasification reactor 210, a heat exchanger 220, a turbine 230 and a water-gas shift reaction vessel 240. Note that while the embodiment of apparatus 200 described herein includes a water-gas shift reaction vessel to enhance the output of hydrogen by conversion of some or all of the carbon monoxide in the syngas, alternative embodiments similar to apparatus 200 can be practiced without the water-gas shift reaction vessel.

Membrane wall gasification reactor 210 includes an inlet 211 in fluid communication with a conduit 213 for introducing a whole crude oil feedstock, a conduit 219 for introducing a controlled amount of solid ash-producing material, a conduit 215 for introducing a controlled amount of a pressurized stream of oxygen or an oxygen-containing gas, and a conduit 217 for introducing a controlled amount of steam. Membrane wall gasification reactor 210 also includes an outlet 212 for discharging hot raw syngas.

Heat exchanger 220 includes an inlet 221 in fluid communication with outlet 212 of the membrane wall gasification reactor 210, an outlet 222 for discharging steam, and an outlet 224 for discharging cooled syngas.

Turbine 230 includes an inlet 231 in fluid communication with outlet 222 of the heat exchanger 220, and an electrical conductor 232 for transmitting the electricity generated, and an outlet 234 for low pressure stream.

The optional water-gas shift reaction vessel 240 includes an inlet 241 in fluid communication with outlet 224 of the heat exchanger 220 via a three-way valve 226 for receiving cooled syngas and a conduit 243 for introducing a controlled amount of steam, and an outlet 242 for discharging the hydrogen rich shifted syngas product.

In the practice of the method of the invention, a whole crude oil feedstock is introduced as a pressurized feedstream via conduit 213 into the membrane wall gasification reactor 210 along with a predetermined amount of solid ash-producing material via conduit 219, a predetermined amount of oxygen or an oxygen-containing gas via conduit 215 and a predetermined amount of steam via conduit 217. In order to optimize the operation of the reactor, an analysis of the carbon content of the crude oil feed should previously be obtained in order to determine the stoichiometric amount of oxygen that is to be introduced into the gasifier. One method of carbon analysis that is suited for this purpose is described in ASTM D-5291.

The whole crude oil and solid material are mixed, e.g., using an inline mixer, a flow-through mixing vessel or other known apparatus. The mixture of crude oil and solid ash-producing material is partially oxidized in the membrane wall gasification reactor 210 to produce hydrogen and carbon monoxide in the form of a hot raw syngas. A particular advantage of the process of the invention is that no auxiliary or supplemental fuel gas is required in order to maintain the gasification temperature, since all of the fuel values required for combustion are present in the lighter components of the whole crude oil. The slag formed in the gasification reactor from the ash-producing material is also supplemented by some of the constituents that are present in the crude oil.

Hot raw syngas is discharged from outlet 212 of the membrane wall gasification reactor 210 and passed to inlet 221 of the heat exchanger 220 to produce a cooled syngas that is discharged via outlet 224. Steam discharged from outlet 222 of the heat exchanger 220 is passed to inlet 231 of turbine 230 to produce electricity that is transmitted via conductor outlet 232. Low pressure stream from the turbine is discharged via outlet 234.

In certain embodiments, at least a portion of the cooled syngas is conveyed via valve 226 to inlet 241 of the water-gas shift reaction vessel 240 with steam introduced via conduit 243. The steam can optionally be derived from the steam generator 220. Carbon monoxide is converted to hydrogen in the presence of steam through the water-gas shift reaction represented by $CO+H_2O \rightarrow CO_2+H_2$. The content of carbon monoxide is reduced to less than one mol % after the water-gas shift reaction. A mixture of hydrogen, carbon dioxide, unreacted carbon monoxide and other impurities is discharged via outlet 242 as shifted syngas. High purity hydrogen gas is optionally recovered by a process such as pressure swing adsorption (PSA), or by use of membranes, absorption, adsorption, or combinations thereof.

The feedstocks for the process described herein are whole crude oil boiling in the range of from 36° C. to about 1500° C., or even as high as 2000° C. The upper value is estimated based on studies reported in the art and the presence of very high molecular weight compounds present in crude oil. See Katz, D. L. et al., *"Predicting Phase Behavior of Condensate/Crude Oil Systems Using Methane Interaction Coefficients"*, *Journal of Petroleum Technology*, (1978), 1649 and Boduszynski, M. et al., *"Oil & Gas Journal*, Sep. 11, 1995. The feedstock can be a light crude oil that contains from less than 10% to up to about 60% by weight of light fractions boiling in the range of from 36° C. to 370° C. The feedstock can be a heavy bituminous crude oil that contains from less than 25% to up to about 90% by weight of light fractions boiling in the range of from 36° C. to 565° C. The hydrogen content of the light fraction is typically in the range of from 12 to 16 w %.

The addition of a solid ash-producing material to the whole crude oil reactor feed is required to produce enough molten ash to condense on the cooled reactor sidewall to form the protective coating of liquid slag. Although the whole crude oil contains some constituents that will produce molten ash particles upon combustion, the total volume of such ash-producing constituents present in the crude oil is not alone sufficient to produce a protective slag coating on the reactor walls. The solid ash-producing material can include natural and/or synthetic oxides. Suitable materials for forming the slag on the reactor walls are one or more oxides of elements from Groups IA-VA, IVB, VIIIB of the Periodic Table. Preferred compounds include one or more oxides containing Si, Al, Fe, Ca, Mg, P, K, Na, S and Ti. The oxides are of the type typically produced by the partial combustion of coal. The amount of sulfur present in heavy oils such as vacuum residues, bitumens, and in solids such as asphaltenes and coke is high and the oxides formed are solid sulfates or sulfites. The solid ash-producing material content can constitute from 2% to 10 w % of the whole crude oil, with lower values in the range being preferred.

The solid ash-producing material is preferably in the form of finely divided particles that are free-flowing in a dry state. The particle size is sufficiently small to avoid any clogging of nozzles or other distribution means in the reactor. The particles should pass Tyler mesh size 35 screen. These particles can be introduced into the liquid feed sufficiently upstream of the membrane wall reactor to provide for their distribution throughout the flowing feed stream. In order to assure a sufficiently uniform mixing of the particles, the feed stream can be passed through an in-line mixer, or other devices that are known in the art to achieve the desired degree of mixing of a dry material in a liquid stream to which it is added.

In other embodiments, the dry particulate material can be treated, e.g., by spraying, with surfactant, to facilitate mixing with the whole crude oil. In order to facilitate pumping and metering, the dry particulate material(s) can be premixed with a portion of the whole crude oil feed, or some other liquid hydrocarbon material in a separate mixing vessel and stored or directly withdrawn as needed and added as a concentrated solid/liquid mixture in the appropriate proportion to the whole crude oil feed to achieve the desired weight percentages of solid ash-producing material.

In general, the operating conditions for the membrane wall gasification reactor include a temperature in the range of from 1200° C. to 1800° C.; a pressure in the range of from 30 bars to 100 bars; a mole ratio of oxygen-to-carbon content of the feedstock in the range of from 0.1:1 to 2:1, in certain embodiments from 0.5:1 to 2:1, and in further embodiments from 1:1 to 5:1; a mole ratio of steam-to-carbon content of the feedstock in the range of from 0.1:1 to 10:1, in certain embodiments from 0.1:1 to 2:1, and in further embodiments from 0.4:1 to 0.6:1.

The properties of the syngas subjected to the water-gas shift reaction are a temperature in the range of from 150° C. to 400° C.; a pressure in the range of from 1 bar to 60 bars; and a mole ratio of water-to-carbon monoxide in the range of from 5:1 to 3:1.

Distinct advantages are offered by the apparatus and processes described herein when compared to other whole crude oil processes. The present invention eliminates the cost related to the distillation of whole crude oil. Valuable syngas and/or hydrogen gas, process steam and electricity are efficiently produced for on-site refinery use. The process of the present invention can be practiced to particular advantage when hydrogen is needed for hydroprocessing and natural gas is not available. This is usually the case in refineries when full conversion is required to meet the demand for cleaner and lighter products, such as gasoline, jet fuel, and diesel transportation fuels.

Example

In this example based on modeling, a 1000 kg sample consisting of a mixture of 968.7 kg of whole crude oil containing 31.3 kg of finely divided solid ash material representing about 3% by weight of the total liquid feed is introduced as a pressurized feedstock into a membrane wall gasification reactor. The gasification reactor is operated at 1045° C. and 28 bars. The ratio of steam-to-carbon is 0.6:1 by weight. The ratio of oxygen-to-carbon is 1:0.85 by weight. The whole crude oil is partially oxidized to produce hydrogen and carbon monoxide which are recovered as a hot raw syngas and passed to a heat exchanger to generate steam. The cooled raw syngas is sent to a water-gas shift reaction vessel to increase the hydrogen yield. The water-gas shift reaction is conducted at 318° C. and 1 bar. The mole ratio of steam-to-carbon monoxide is 3:1. The product yields are summarized in Table 1. As can be seen from Table 1, gasification of 968.7 kg of whole crude oil produces 256.2 kg of hydrogen gas.

TABLE 1

Gasification Yields

| Stream | Whole Crude Oil (via inlet 213) Kg | Oxygen (via conduit 215) Kg | Steam (via conduit 217) Kg | Raw Syngas (via outlet 224 and inlet 241) Kg | Steam (via conduit 243) Kg | Shifted Syngas (via outlet 242) Kg |
|---|---|---|---|---|---|---|
| Total Pitch (containing ash) | 1000.0 | | | | | |
| Pitch (containing hydrocarbons) | 968.7.0 | | | | | |
| Oxygen | | 1000.0 | | | | |
| $CH_4$ | | | | 6.5 | | 6.5 |
| $H_2$ | | | | 137.3 | | 256.2 |
| CO | | | | 1738.8 | | 86.9 |
| $CO_2$ | | | | 371.9 | | 2967.7 |
| $H_2O$ | | | 506.7 | 182.8 | 1521.5 | 642.4 |
| $H_2S$ | | | | 28.6 | | 28.6 |
| COS | | | | 5.6 | | 5.6 |
| $N_2$ | | | | 2.5 | | 2.5 |
| Ar | | | | 0.0 | | 0.0 |
| $NH_3$ | | | | 0.0 | | 0.1 |
| Total | 1000.0 | 35.0 | 506.7 | 2474.2 | 1521.5 | 3996.5 |
| Material Balance Total | | | | 98.7 | | |
| MB Oxygen | | | | 98.5 | | |

The method and system of the present invention have been described above and with reference to the attached drawings; however, modifications derived from this description will be apparent to those of ordinary skill in the art and the scope of protection for the invention is to be determined by the claims that follow.

The invention claimed is:

1. An integrated process for the gasification of a whole crude oil feedstock to produce a synthesis gas and electricity, the process comprising:

a. introducing into a membrane wall gasification reactor, a feedstock comprising a mixture of whole crude oil and a predetermined amount of a solid ash-producing material that forms a protective slag coating on the sidewalls of the membrane wall gasification reactor, and a predetermined amount of oxygen and steam based on the carbon content of the feedstock;
  b. subjecting the mixture of whole crude oil and solid ash-producing material to partial oxidation to produce hydrogen and carbon monoxide in the form of a hot raw synthesis gas and the protective slag coating on the sidewalls of the membrane wall gasification reactor;
  c. passing the hot raw synthesis gas to a steam-generating heat exchanger to cool the hot raw synthesis gas and to produce steam;
  d. introducing the steam from the heat exchanger into a turbine to produce electricity; and
  e. recovering the cooled synthesis gas.

2. The process of claim 1, wherein the solid ash producing material is selected from the group consisting of natural and synthetic oxides of Si, Al, Fe, Ca, Mg, P, K, Na, S, and Ti and mixtures thereof, and in the form of finely divided particles and is mixed with the whole crude oil and constitutes 2% to 5% by weight of the total weight of the feedstock.

3. The process of claim 1, wherein the whole crude oil contains from 1 to 60 w % of light fractions boiling in the range of from 36° C. to 370° C.

4. The process of claim 1, wherein the whole crude oil contains from 1 to 10 w % of light fractions boiling in the range of from 36° C. to 370° C.

5. The process of claim 1, wherein the whole crude oil contains from 1 to 90 w % of light fractions boiling in the range of from 36° C. to 565° C.

6. The process of claim 1, wherein the whole crude oil contains from 1 to 25 w % of light fractions boiling in the range of from 36° C. to 565° C.

7. The process of claim 3, wherein the hydrogen content of the light fraction is in the range of from 12 to 16 w %.

8. The process of claim 1, wherein the operating temperature of the gasification reactor is in the range of from 1200° C. to 1800° C.

9. The process of claim 1, wherein the mole ratio of oxygen-to-carbon in the gasification reactor is in the range of from 0.5:1 to 10:1.

10. The process of claim 1, wherein the mole ratio of oxygen-to-carbon in the gasification reactor is in the range of from 1:1 to 2:1.

11. The process of claim 1, wherein the steam-to-carbon in the gasification reactor is in the range of from 0.1:1 to 10:1 by weight.

12. The process of claim 11, wherein the steam-to-carbon in the gasification reactor is in the range of from 0.5:1 to 1:1 by weight.

13. The process of claim 1, further comprising subjecting the cooled syngas from step (e) to a water-gas shift reaction with a predetermined amount of steam, and recovering a mixture of hydrogen and carbon dioxide.

14. The process of claim 13, wherein the mole ratio of water-to-carbon monoxide in the water-gas shift reaction vessel is in the range of from 5:1 to 3:1.

\* \* \* \* \*